(12) United States Patent
Chen

(10) Patent No.: US 7,240,579 B2
(45) Date of Patent: Jul. 10, 2007

(54) TRANSMISSION DEVICE WITH SWITCHABLE GEAR RATIOS

(75) Inventor: Hsin Hong Chen, Jhunan Township, Miaoli County (TW)

(73) Assignee: Avision Inc., Hsinchu (TW)

( * ) Notice: Subject to any disclaimer, the term of this patent is extended or adjusted under 35 U.S.C. 154(b) by 187 days.

(21) Appl. No.: 11/169,896

(22) Filed: Jun. 30, 2005

(65) Prior Publication Data

US 2006/0005650 A1 Jan. 12, 2006

(30) Foreign Application Priority Data

Jul. 6, 2004 (TW) .............................. 93120176 A

(51) Int. Cl.
*F16H 3/34* (2006.01)

(52) U.S. Cl. ...................................................... 74/354

(58) Field of Classification Search ................. 74/354, 74/352, 353; 358/497, 412
See application file for complete search history.

(56) References Cited

U.S. PATENT DOCUMENTS 2,431,149 A * 11/1947 Sylvander .................... 74/355
4,347,009 A * 8/1982 Brown ........................ 400/611
6,070,482 A * 6/2000 Kugio et al. .................. 74/354
7,150,671 B2 * 12/2006 Maleika ...................... 446/462

* cited by examiner

*Primary Examiner*—Sherry Estremsky
*Assistant Examiner*—Edwin A. Young

(57) ABSTRACT

In a transmission device with switchable gear ratios, a driving gear is disposed onto an output shaft of a motor, a rocker arm is pivoted on the output shaft through an electromagnetic clutch, a rocker arm gear mounted on the rocker arm is driven by the driving gear, a first gear set is driven by the rocker arm gear when the rocker arm is at a first position, a second gear set is driven by the rocker arm gear when the rocker arm is at a second position, and the first gear set and the second gear set have different output rotating speeds. In addition, a first magnetic element attracts the rocker arm at the first position, and a second magnetic element attracts the rocker arm at the second position. Thus, the gear ratio may be switched according to interactions between the electromagnetic clutch and the magnetic elements.

10 Claims, 5 Drawing Sheets

TRANSMISSION DEVICE WITH SWITCHABLE GEAR RATIOS

BACKGROUND OF THE INVENTION

1. Field of the Invention

The invention relates to a transmission device with switchable gear ratios, and more particularly to a transmission device applicable to a scanning apparatus and using magnetic elements in conjunction with a planet gear mechanism to switch the gear ratio.

2. Description of the Related Art

In a conventional flatbed scanning device, a driving device moves a scanning module back and forth. Usually, the moving speed of the scanning module is slower when a document is being scanned, and the moving speed of the scanning module is higher after the document is scanned and the scanning module has to be moved back to the original position in order to shorten the time of the overall scanning process. In addition, the moving speeds of the scanning module for scanning with a high resolution and a low resolution are also different. Thus, it is preferred that the output speed of the driving device may be changed.

In the conventional scanning device, an additional motor or an additional driving device is utilized to switch the gear ratios of power transmitting elements, such as gears in a gear set, so that the output speed may be changed. However, the added motor or driving device occupies extra space in the scanning device, which is disadvantageous to the miniaturization of the scanning device.

SUMMARY OF THE INVENTION

It is therefore an object of the invention to provide a simple and miniaturized transmission device using magnetic elements in conjunction with a planet gear mechanism to switch the gear ratio.

To achieve the above-mentioned object, the invention provides a transmission device including a motor, a driving gear, a rocker arm, a rocker arm gear, a first gear set, a second gear set, a first magnetic element and a second magnetic element. The motor has an output shaft. The driving gear is disposed onto the output shaft. The rocker arm is pivoted on the output shaft through an electromagnetic clutch. The rocker arm gear is driven by the driving gear and mounted on the rocker arm. The first gear set is driven by the rocker arm gear when the rocker arm is at a first position. The second gear set is driven by the rocker arm gear when the rocker arm is at a second position. The first gear set and the second gear set have different output rotating speeds. The first magnetic element disposed at the first position attracts the rocker arm at the first position. The second magnetic element disposed at the second position attracts the rocker arm at the second position.

It is possible to eliminate the electromagnetic clutch, and the force for switching the rocker arm between the first and second positions may be provided according to the operation principle of a planet gear mechanism. Alternatively, it is also possible to provide the force for switching the rocker arm between the first and the second positions using an electromagnet with variable magnetic polarity and/or a permanent magnet.

DETAILED DESCRIPTION OF THE INVENTION

Figure 1:
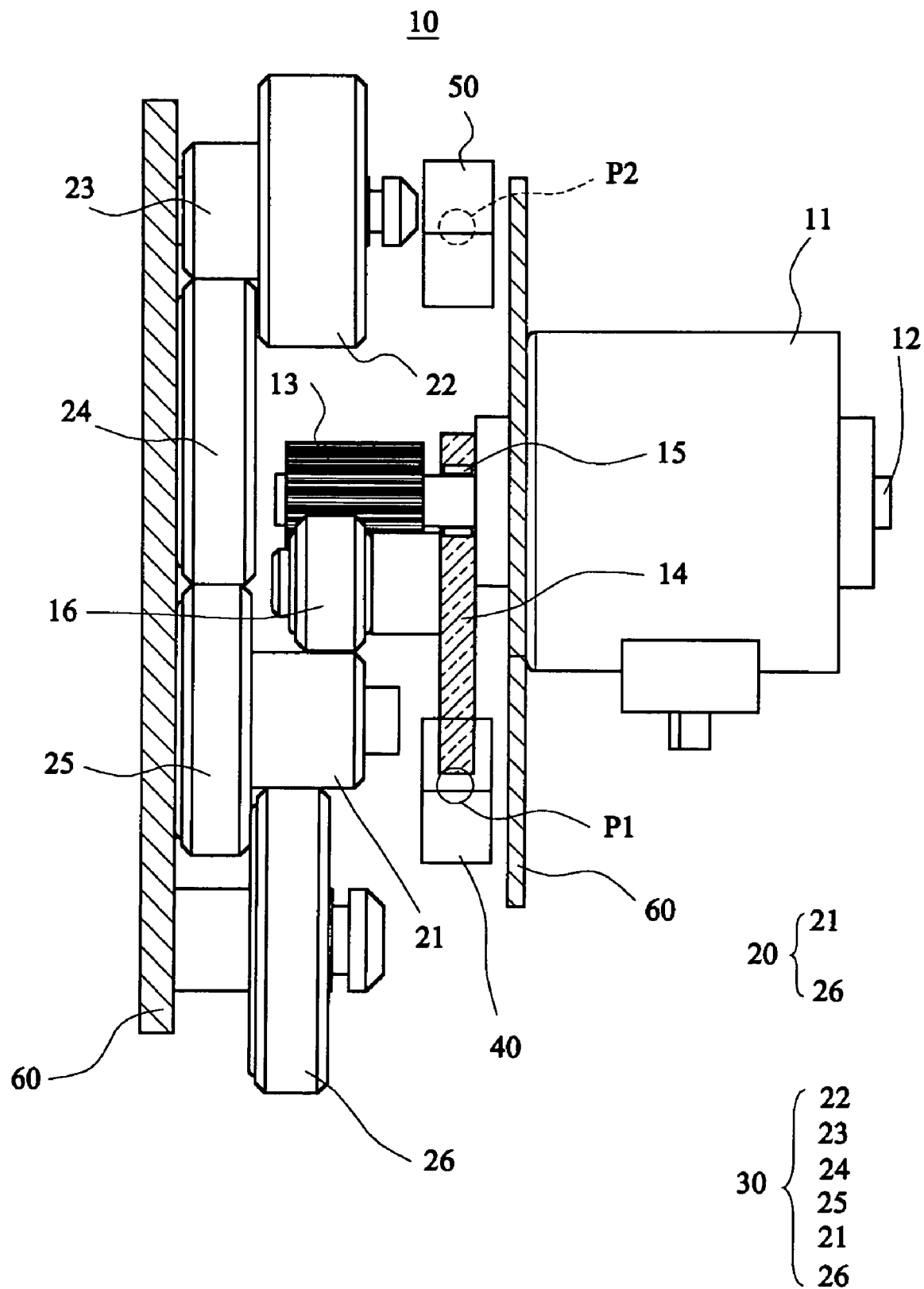
FIG. 1 is a schematic top view showing a transmission device at a high speed state according to a first embodiment of the invention.
Figure 2:
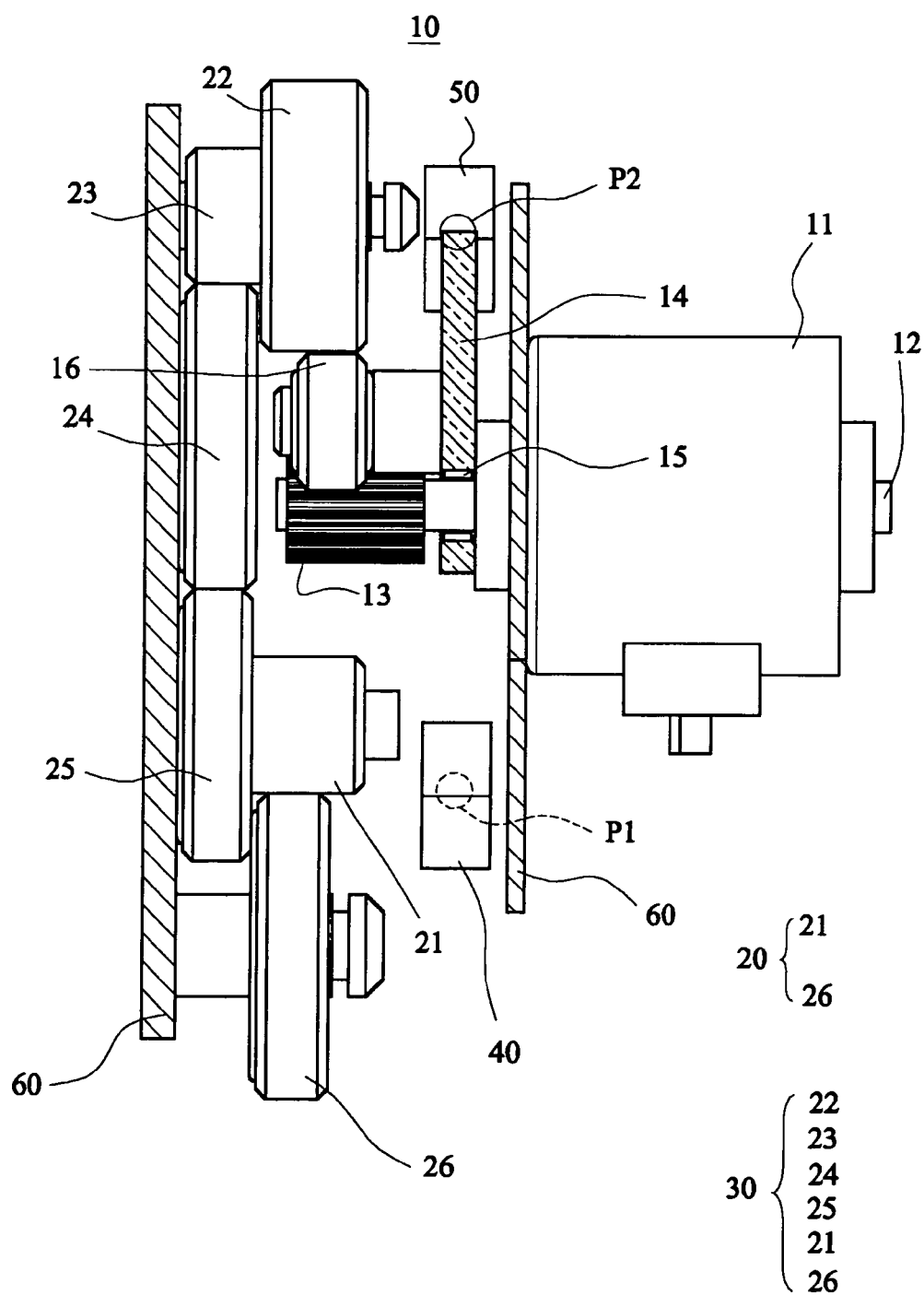
FIG. 2 is a schematic top view showing the transmission device at a low speed state according to the first embodiment of the invention.
Figure 3:
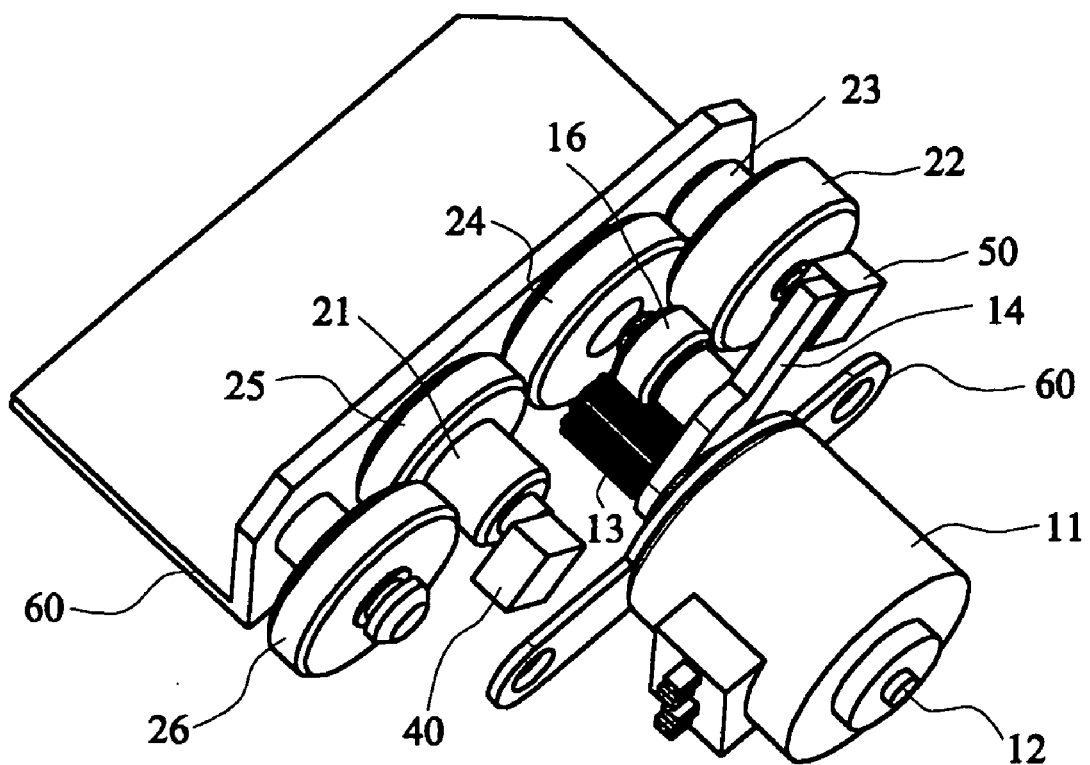
FIG. 3 is a pictorial view showing the transmission device of FIG. 2.
Figure 4:
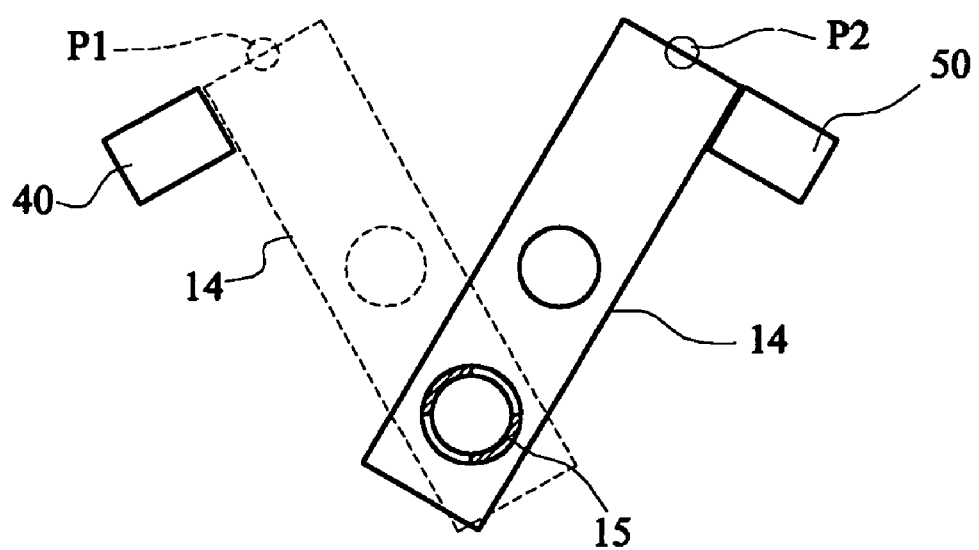
FIG. 4 is a schematic illustration showing a rocker arm of FIG. 2.

FIGS. 1 and 2 are schematic top views showing a transmission device at a high speed state and a low speed state according to a first embodiment of the invention, respectively. FIG. 3 is a pictorial view showing the transmission device of FIG. 2. FIG. 4 is a schematic illustration showing a rocker arm of FIG. 2. Referring to FIGS. 1 to 4, a transmission device 10 of this embodiment includes a motor 11, a driving gear 13, a rocker arm 14, a rocker arm gear 16, a first gear set 20, a second gear set 30, a first magnetic element 40 and a second magnetic element 50. The motor 11 is disposed onto a base 60 and has an output shaft 12. The driving gear 13 is disposed onto the output shaft 12. The rocker arm 14 is pivoted on the output shaft 12 through an electromagnetic clutch 15. The rocker arm gear 16 is driven by the driving gear 13 and mounted on the rocker arm 14.

The first gear set 20 includes a first gear 21 driven by the rocker arm gear 16, and an output gear 26 driven by the first gear 21. The first gear set 20 is driven by the rocker arm gear 16 when the rocker arm 14 is at a first position P1.

The second gear set 30 and the first gear set 20 share a portion of the gears. Thus, the second gear set 30 includes a second gear 22 driven by the rocker arm gear 16, a third gear 23 rotated by the second gear 22 coaxial therewith, a fourth gear 24 driven by the third gear 23, a fifth gear 25 driven by the fourth gear 24, the first gear 21 rotated by the fifth gear 25 coaxial therewith, and the output gear 26 driven by the first gear 21.

The second gear set 30 is driven by the rocker arm gear 16 when the rocker arm 14 is at a second position P2. The first gear set 20 and the second gear set 30 have different output rotating speeds.

The first magnetic element 40 disposed at the first position P1 attracts the rocker arm 14 at the first position P1, as shown in FIG. 1. The second magnetic element 50 disposed at the second position P2 attracts the rocker arm 14 at the second position P2, as shown in FIG. 2. The first magnetic element 40 and the second magnetic element 50 are permanent magnets in this embodiment, and electromagnets in another embodiment.

When the state of FIG. 1 is to be changed to the state of FIG. 2, the output shaft 12 of the motor 11 rotates clockwise and the electromagnetic clutch 15 is enabled to fix the output shaft 12 and the rocker arm 14 together, such that the rocker arm 14 is rotated into the state of FIG. 2, and the rocker arm 14 is attracted by the second magnetic element 50. Then, the electromagnetic clutch 15 is disabled such that the output shaft 12 can rotate relative to the rocker arm 14 to facilitate the subsequent power transmission.

When the state of FIG. 2 is to be changed to the state of FIG. 1, the output shaft 12 of the motor 11 rotates counter-clockwise and the electromagnetic clutch 15 is enabled to fix the output shaft 12 and the rocker arm 14 together, such that the rocker arm 14 is rotated into the state of FIG. 1 and the rocker arm 14 is attracted by the first magnetic element 40. Then, the electromagnetic clutch 15 is disabled such that the output shaft 12 can rotate relative to the rocker arm 14 to facilitate the subsequent power transmission. It is to be noted that all of the gears mentioned hereinabove might be replaced by rollers.

Figure 5:
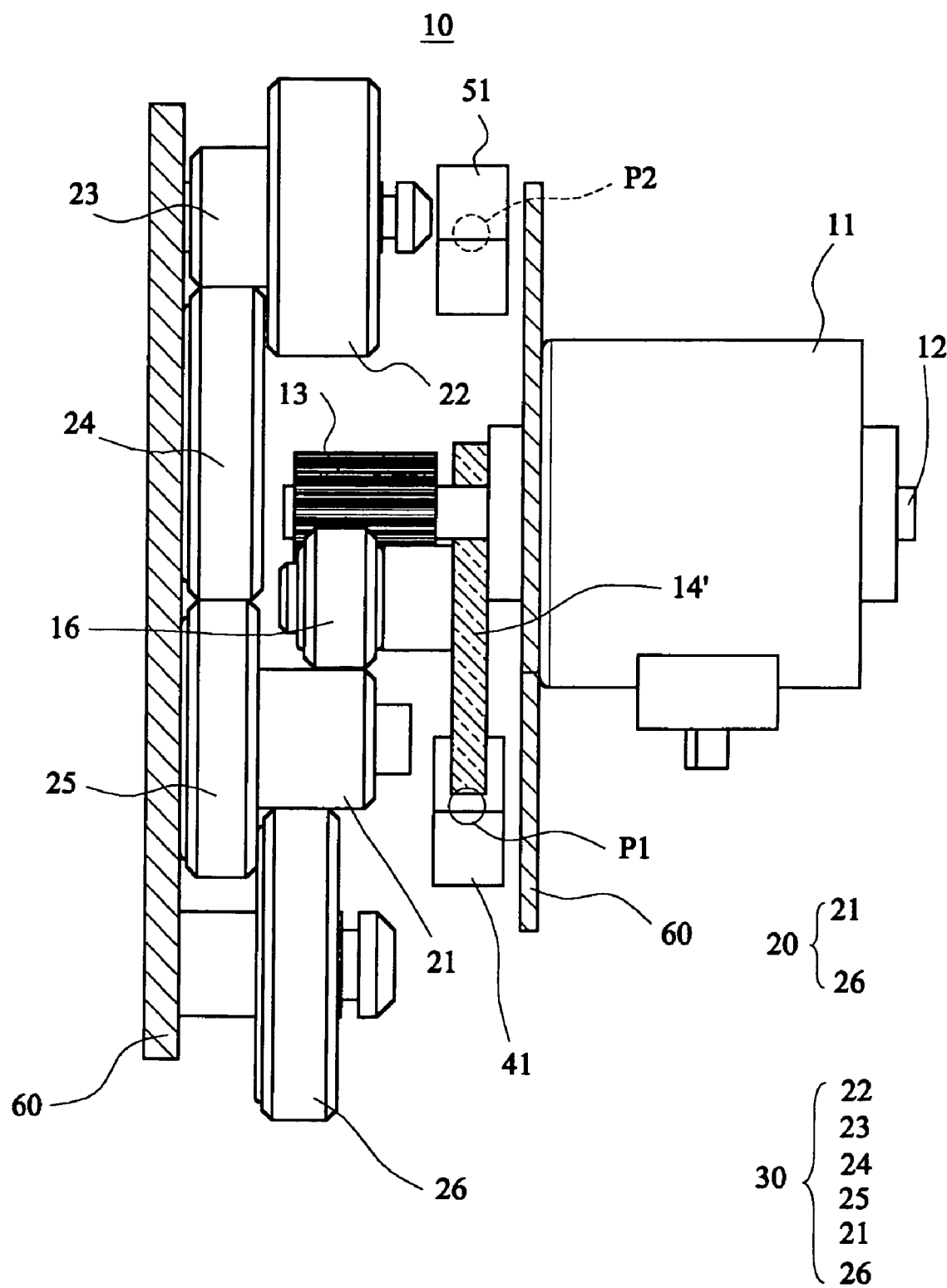
FIG. 5 is a schematic top view showing a transmission device at the high speed state according to a second embodiment of the invention.

FIG. 5 is a schematic top view showing a transmission device at the high speed state according to a second embodiment of the invention. Referring to FIG. 5, the transmission device 10 of this embodiment includes a motor 11, a driving gear 13, a rocker arm 14', a rocker arm gear 16, a first gear set 20, a second gear set 30, a first solenoid 41 and a second solenoid 51. Some of the elements are similar to those of the first embodiment, and only the elements different from those of the first embodiment will be described.

What is different from the first embodiment is that the rocker arm 14' of the second embodiment is directly pivoted on the output shaft 12. The first solenoid 41 disposed at the first position P1 attracts the rocker arm 14' at the first position P1. The second solenoid 51 disposed at the second position P2 attracts the rocker arm 14' at the second position P2. Thus, the embodiment controls the rotation direction of the rocker arm 14' by controlling the rotation direction of the motor 11 according to the operation principle of a planet gear mechanism. Then, the first solenoid 41 and the second solenoid 51 are adopted to fix the rocker arm 14' at the first position P1 and the second position P2, respectively.

Figure 6:
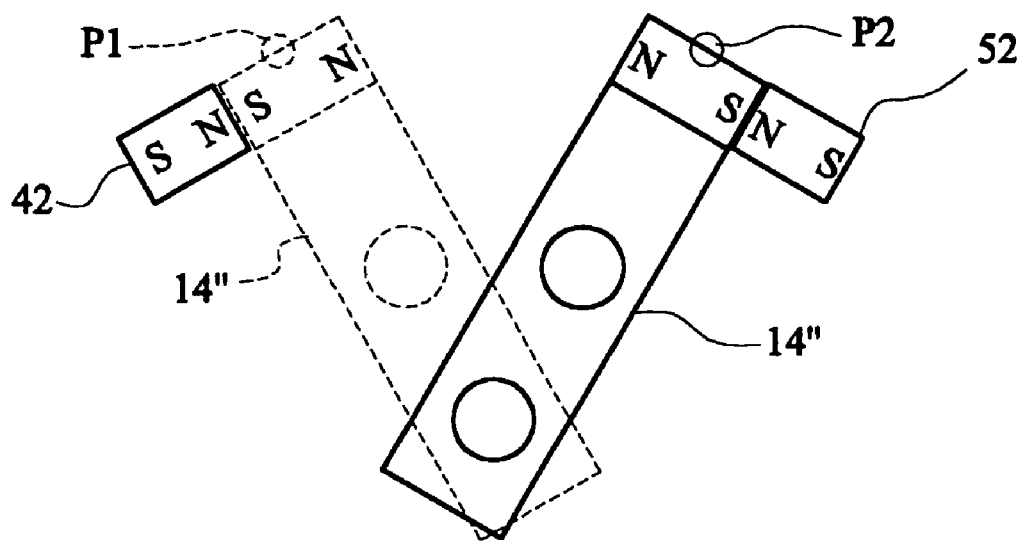
FIG. 6 is a schematic illustration showing a rocker arm of a transmission device according to a third embodiment of the invention.

FIG. 6 is a schematic illustration showing a rocker arm of a transmission device according to a third embodiment of the invention. As shown in FIG. 6, a rocker arm 14" of this embodiment may be applied to the transmission devices of FIGS. 1 and 5.

What is different from the first embodiment is that the rocker arm 14" is pivoted on the output shaft 12 and has two ends each having a variable magnetic pole N or S. The first magnetic element 42 and the second magnetic element 52 are permanent magnets (or electromagnets), and the rocker arm 14" is an electromagnet having variable magnetic poles N and S. Changing the current flowing direction in the rocker arm 14" pertaining to the electromagnet can adjust the magnetic polarity of the rocker arm 14" so as to repel the rocker arm 14" and thus change the position of the rocker arm 14".

Figure 7:
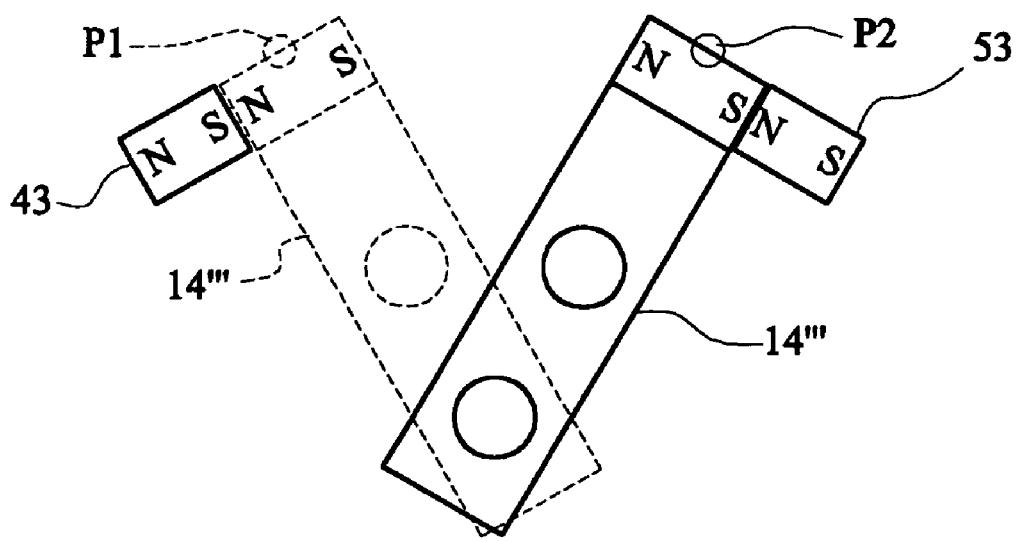
FIG. 7 is a schematic illustration showing a rocker arm of a transmission device according to a fourth embodiment of the invention.

FIG. 7 is a schematic illustration showing a rocker arm of a transmission device according to a fourth embodiment of the invention. As shown in FIG. 7, a rocker arm 14''' of this embodiment may be applied to the transmission devices of FIGS. 1 and 5.

What is different from the third embodiment is that the rocker arm 14''' is pivoted on the output shaft 12 and the rocker arm 14''' has two ends each having a constant magnetic pole N or S. The first magnetic element 43 disposed at the first position P1 attracts the rocker arm 14''' at the first position P1, and the magnetic polarity of the first magnetic element 43 is variable. The second magnetic element 53 disposed at the second position P2 attracts the rocker arm 14''' at the second position P2, and the magnetic polarity of the second magnetic element 53 is variable. Adjusting the magnetic polarity of the first magnetic element 43 and the second magnetic element 53 can momentarily repel the rocker arm 14''' pertaining to the permanent magnet or the electromagnet so as to change the position of the rocker arm 14'''.

According to the above-mentioned structures of the invention, the gear ratio may be changed by effectively using the planet gear mechanism and/or the magnetic elements. Because the planet gear mechanism has to be disposed in the transmission device and the magnetic elements occupy a small space and have simple structures, the problems of the insufficient space and the complicated structures in the prior art may be solved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A transmission device, comprising:
a motor having an output shaft;
a driving gear disposed onto the output shaft;
a rocker arm pivoted on the output shaft through an electromagnetic clutch;
a rocker arm gear driven by the driving gear and mounted on the rocker arm;
a first gear set driven by the rocker arm gear when the rocker arm is at a first position;
a second gear set driven by the rocker arm gear when the rocker arm is at a second position, wherein the first gear set and the second gear set have different output rotating speeds;
a first magnetic element disposed at the first position for attracting the rocker arm; and
a second magnetic element disposed at the second position for attracting the rocker arm.

2. The transmission device according to claim 1, wherein the first magnetic element and the second magnetic element are permanent magnets.

3. The transmission device according to claim 1, wherein:
the first gear set comprises a first gear driven by the rocker arm gear, and an output gear driven by the first gear; and
the second gear set comprises a second gear driven by the rocker arm gear, a third gear rotated by the second gear coaxial therewith, a fourth gear driven by the third gear, a fifth gear driven by the fourth gear, the first gear rotated by the fifth gear coaxial therewith, and the output gear driven by the first gear.

4. A transmission device, comprising:
a motor having an output shaft;
a driving gear disposed onto the output shaft;
a rocker arm pivoted on the output shaft;
a rocker arm gear driven by the driving gear and mounted on the rocker arm;
a first gear set driven by the rocker arm gear when the rocker arm is at a first position;
a second gear set driven by the rocker arm gear when the rocker arm is at a second position, wherein the first gear set and the second gear set have different output rotating speeds;
a first solenoid disposed at the first position for attracting the rocker arm; and
a second solenoid disposed at the second position for attracting the rocker arm.

5. The transmission device according to claim 4, wherein:
the first gear set comprises a first gear driven by the rocker arm gear, and an output gear driven by the first gear; and
the second gear set comprises a second gear driven by the rocker arm gear, a third gear rotated by the second gear coaxial therewith, a fourth gear driven by the third gear, a fifth gear driven by the fourth gear, the first gear rotated by the fifth gear coaxial therewith, and the output gear driven by the first gear.

6. A transmission device, comprising:
a motor having an output shaft;
a driving gear disposed onto the output shaft;
a rocker arm pivoted on the output shaft and having two ends, each of which has variable magnetic polarity;
a rocker arm gear driven by the driving gear and mounted on the rocker arm;
a first gear set driven by the rocker arm gear when the rocker arm is at a first position;
a second gear set driven by the rocker arm gear when the rocker arm is at a second position, wherein the first gear set and the second gear set have different output rotating speeds;
a first magnetic element disposed at the first position for attracting the rocker arm; and
a second magnetic element disposed at the second position for attracting the rocker arm.

7. The transmission device according to claim 6, wherein the first magnetic element and the second magnetic element are permanent magnets.

8. The transmission device according to claim 6, wherein:
the first gear set comprises a first gear driven by the rocker arm gear, and an output gear driven by the first gear; and
the second gear set comprises a second gear driven by the rocker arm gear, a third gear rotated by the second gear coaxial therewith, a fourth gear driven by the third gear, a fifth gear driven by the fourth gear, the first gear rotated by the fifth gear coaxial therewith, and the output gear driven by the first gear.

9. A transmission device, comprising:
a motor having an output shaft;
a driving gear disposed onto the output shaft;
a rocker arm pivoted on the output shaft and having two ends, each of which has a fixed magnetic pole;
a rocker arm gear driven by the driving gear and mounted on the rocker arm;
a first gear set driven by the rocker arm gear when the rocker arm is at a first position;
a second gear set driven by the rocker arm gear when the rocker arm is at a second position, wherein the first gear set and the second gear set have different output rotating speeds;
a first magnetic element, disposed at the first position, for attracting the rocker arm, wherein the first magnetic element has variable magnetic polarity; and
a second magnetic element, disposed at the second position, for attracting the rocker arm, wherein the second magnetic element has variable magnetic polarity.

10. The transmission device according to claim 9, wherein:
the first gear set comprises a first gear driven by the rocker arm gear, and an output gear driven by the first gear; and
the second gear set comprises a second gear driven by the rocker arm gear, a third gear rotated by the second gear coaxial therewith, a fourth gear driven by the third gear, a fifth gear driven by the fourth gear, the first gear rotated by the fifth gear coaxial therewith, and the output gear driven by the first gear.

* * * * *